United States Patent
Achmad

[19]

[11] Patent Number: 5,950,775
[45] Date of Patent: Sep. 14, 1999

[54] IN-TUBE SHOCK ABSORBER MOUNTED ELECTROMAGNETICALLY OPERATED DAMPER VALVE AND SHOCK ABSORBER INCLUDING ADAPTER

[76] Inventor: Muchlis Achmad, c/o/ H.R. Textron, Inc. 25200 W. Rye Canyon Rd., Valencia, Calif. 91355

[21] Appl. No.: 08/909,749

[22] Filed: Aug. 12, 1997

[51] Int. Cl.⁶ .................................................. B60G 17/08
[52] U.S. Cl. ................................. 188/282.2; 188/322.13; 188/266.2
[58] Field of Search .............................. 188/266.1–266.6, 188/322.15, 322.22, 322.13, 282.2–282.6, 321.11, 299.1, 266, 267, 267.1, 266.3, 266.4, 266.7, 1.11 R, 318, 317, 319.2

[56] References Cited

U.S. PATENT DOCUMENTS

| | | | |
|---|---|---|---|
| 4,671,392 | 6/1987 | Wossner | 188/322.22 |
| 4,723,640 | 2/1988 | Beck | 188/282.3 |
| 4,854,429 | 8/1989 | Casey | 188/322.15 |
| 4,974,707 | 12/1990 | Neumann et al. | 188/322.13 |
| 5,078,241 | 1/1992 | Ackermann et al. | 188/319.2 |
| 5,160,162 | 11/1992 | Mouri et al. | 188/266.7 |
| 5,293,970 | 3/1994 | Schneider et al. | 188/266.5 |
| 5,303,803 | 4/1994 | Grun et al. | 188/282.2 |
| 5,368,142 | 11/1994 | Ashiba et al. | 188/266.5 |
| 5,518,090 | 5/1996 | Miller et al. | 188/282.4 |

FOREIGN PATENT DOCUMENTS

| | | | |
|---|---|---|---|
| 5196081 | 8/1993 | Japan | 188/282.5 |

*Primary Examiner*—Douglas C. Butler
*Attorney, Agent, or Firm*—Fulbright & Jaworski, L.L.P.

[57] ABSTRACT

A shock absorber for use upon each corner of an automotive vehicle which includes a piston mounted upon a piston rod and appropriately disposed within a cylinder such that the piston separates the cylinder into a pair of operating chambers containing fluid. A damper valve which is electromagnetically operated is seated within the hollow interior of the piston rod. The damper valve includes a sleeve, spool, center pole piece and a coil which are retained within position within the interior of the piston rod by an appropriate adapter. The piston is seated upon an extension of the adapter and is held in place by a nut. Fluid within the chambers flows in a substantially unrestricted fashion through a flow path defined by the damper valve and is restricted in its flow by actuation of the coil to provide an electromagnetic field that moves the spool according to the signal applied.

4 Claims, 3 Drawing Sheets

5,950,775

IN-TUBE SHOCK ABSORBER MOUNTED ELECTROMAGNETICALLY OPERATED DAMPER VALVE AND SHOCK ABSORBER INCLUDING ADAPTER

BACKGROUND OF THE INVENTION

The present invention relates to shock absorbers for use in automotive vehicles and more particularly to vibration dampers of the type which are mounted upon the shock absorber and are electromagnetically actuated to damp vibrations. More specifically, the damper valve is mounted within the piston rod and the piston rod forms a part of the magnetic circuit for the valve.

PRIOR ART

Such shock absorbers are traditionally constructed by having a damping piston which is fastened to a piston rod which divides the work cylinder into two chamber halves filled with a hydraulic damping fluid. The piston typically incorporates valves for restricting the flow of fluid therethrough as the piston moves along the cylinder. The valves are designed to provide a greater resistance in one direction of the piston movement than the other. These valves are usually preset during manufacture and the setting of these valves is not suitable for all vehicle load conditions generated by surfaces over which the vehicle may be driven and/or the speeds at which the vehicle may be driven.

To accommodate varying loads, road surfaces, driving conditions and the like, shock absorbers have been produced with adjustable piston valves and/or with additional control valves as a part thereof. These valves for the most part have been adjustable externally of the shock absorber either manually or electromechanically. In some instances, electromagnetically operated damping valves have been included to accommodate this additional adjustable feature. Typical of such, prior art adjustable hydraulic vibration dampers included within shock absorbers are the devices disclosed in U.S. Pat. Nos. 4,638,896; 5,559,700; 5,409,089; 4,723,640; 4,785,920; 4,854,429.

SUMMARY OF THE INVENTION

An in-piston rod mounted electromagnetically operated damper valve for regulating flow of fluid through a shock absorber to accommodate varying road conditions which includes a spool means reciprocally mounted within a longitudinal bore defined in a sleeve means which includes a transverse fluid flow path. The spool means regulates the flow of fluid through the transverse fluid flow path responsive to electromagnetic energization thereof. Means is provided for producing a magnetic field to move the spool means and includes a coil, a pole piece and a portion of the piston rod. The sleeve means, spool means, coil and pole piece are mounted within a longitudinal bore defined within the portion of the piston rod and the portion of the piston rod comprises a part of a magnetic flux path for providing the magnetic field to move the spool means.

Other objects and advantages of the present invention will become more apparent to those persons having ordinary skill in the art to which the present invention pertains from the foregoing summary taken in conjunction with the accompanying drawings.

DETAILED DESCRIPTION OF THE PREFERRED EMBODIMENTS

Figure 1:
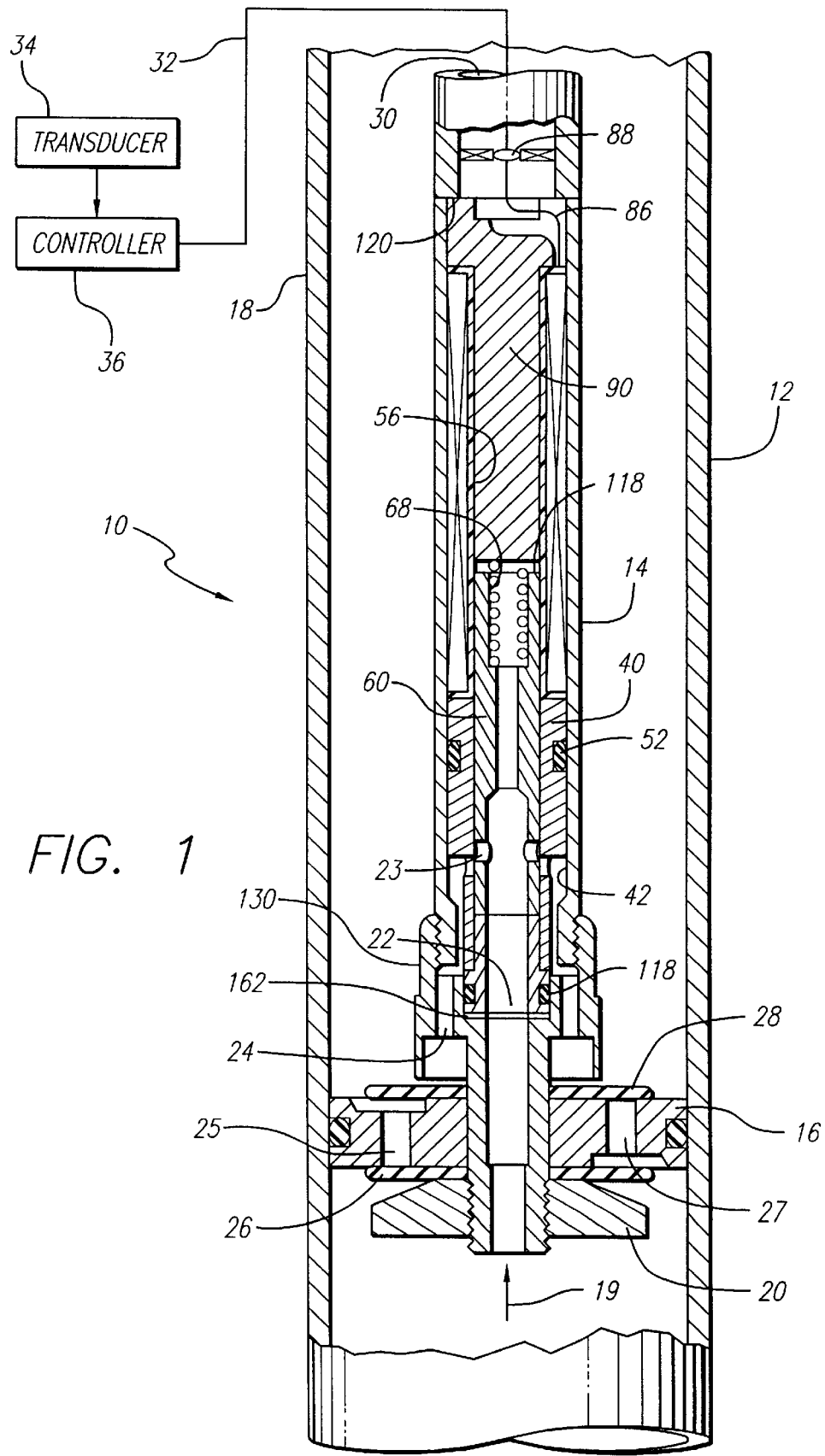
FIG. 1 is a cross-sectional view of part of a telescopic shock absorber incorporating an in-tube mounted electromagnetically operated damper valve constructed according to the principles of the present invention.

As is illustrated in FIG. 1, an electromagnetically actuated damper valve constructed in accordance with the principles of the present invention is shown assembled as part of a typical shock absorber 10. This typical shock absorber 10 includes a cylinder 12 having a piston 16 mounted on a piston rod 18. An electromagnetically actuated damper valve of various configurations may be incorporated with the shock absorber and controlled with appropriate electrical signals.

In a typical automotive vehicle configuration, the vehicle body is supported by four wheels and by four suspensions including springs of known types. Each of the suspensions also includes a shock absorber mounted in a conventional shock absorber configuration as above-generally described. Each corner of the vehicle would also include means for detecting linear position between the vehicle wheel and the suspended vehicle body at that corner of the vehicle. The sensor or transducer may be constructed utilizing any of the well known devices available in the industry capable of sensing such position and providing an output signal. The output signals generated by the transducers are then used to control the damping valve which is mounted within the shock absorber. Such structures as generally described above are well known in the art. For example, as illustrated in U.S. Pat. No. 5,559,700 ('700) above-referenced which is incorporated by reference herein and therefore no further detailed description of the overall system is provided. What is illustrated and discussed hereafter in this application is the construction of the electromagnetic actuated damper valve mounted as an integral part of each shock absorber at each corner of the vehicle.

As is shown in FIG. 1, the damper valve 14 is mounted within the piston rod 18. The damper valve is retained within the piston by an adapter which includes a lower portion upon which the piston 16 is mounted. The piston 16 is held in place by a retaining nut 20. The lower end of the damper valve 14 defines a longitudinal opening defining an inlet 22 through the valve 14 which forms part of a flow path 19 through which fluid contained within the cylinder may flow. The fluid will pass through the inlet 22, through metering slots 23 and out slot 24. In accordance with the illustration of FIG. 1, the damper valve 14 is normally open thus providing a bypass flow of the fluid normally contained within the cylinder 12 on each side of the piston 16. Additional flow is provided through the piston 16 through the longitudinal openings 25 and 27 provided therein. The openings 25 and 27 are blocked by closure members 26 and 28 respectively. As is well known to those skill in the art, as the piston 16 is caused to move upwardly as viewed in FIG. 1, the fluid attempts to flow through the opening 25 and is restrained by the closure member 26 until sufficient force or differential pressure occurs across the piston 16 to cause the closure member 26 to open thereby allowing fluid to flow through the opening 25. Similarly, as the piston is moved downwardly, fluid attempts to flow through the opening 27 and will do so after the differential pressure across the piston exceeds a predetermined amount established by the closure member 28. It will be understood by those skilled in the art that relatively slow movement of the piston 16 within the cylinder 12 will allow fluid to flow in an unrestricted manner through the flow path 19, 22, 23, 24 thereby bypassing the openings 25 and 27 in the piston 16. However, upon very rapid movement of the piston within the cylinder 12 the volume provided by the flow path 19, 22, 23, 24 will be insufficient to permit unrestricted flow of the fluid and a differential pressure will build across the piston 16 thereby bringing into play the flow through the openings 25 and 27 as above-described. Thus it is seen there are parallel flow paths for the fluid in the cylinder 12 on each side of the piston 16 depending upon the operating conditions encountered by the suspension on a particular corner of the vehicle.

Depending upon the operating conditions encountered by a particular corner of the vehicle, it may be desired to stiffen the shock absorber at that particular corner. This would be accomplished by utilizing the signal generated at that particular corner by the position sensor or transducer 34 associated therewith. The signal generated by the transducer would be applied to a controller 36 such as a microprocessor which functions in accordance with a pre-determined algorithm to provide an output signal over the wire 32. The wire 32 is positioned within an opening 30 in the piston rod 18 and is connected as will be described more fully below to electromagnetically energize the damper valve 14. When such occurs the metering slots 23 are closed thus permitting fluid to flow only through the openings 25 and 27 within the piston 16 thereby rendering the shock absorber more stiff.

Referring now to FIGS. 2 through 8, taken in conjunction with FIG. 1, the various component parts of a valve constructed in accordance with the principles of the present invention are shown.

Figure 2:
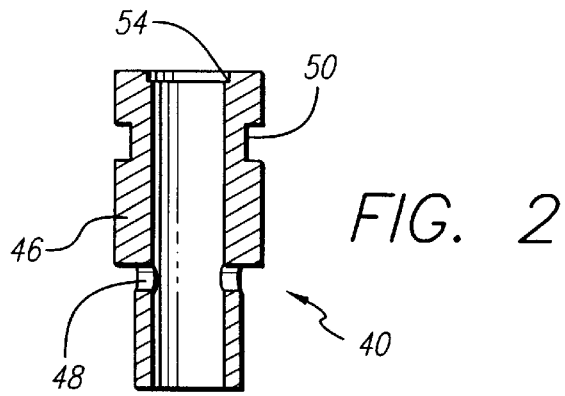
FIG. 2 is a cross-sectional view of the sleeve member of the damper valve of the present invention.

In FIG. 2, the sleeve 40 is illustrated. The sleeve 40 is disposed within a reentrant bore 42 in the piston rod 18. The sleeve 40 defines a longitudinal bore 44 therethrough which provides a portion of the flow path inlet 22. The body 46 of the sleeve 40 is cutaway to provide openings as shown at 48 through which fluid may flow. A groove 50 is circumferentially formed in the body 46 to receive an o-ring 52. A reentrant bore is defined at the upper portion of the bore 44 to define a shoulder or step 54. A tube 56 is seated upon the step 54 and functions as a spacer to provide a defined air gap between the spool and a center pole piece 90 as will be described more fully below.

Figure 3:
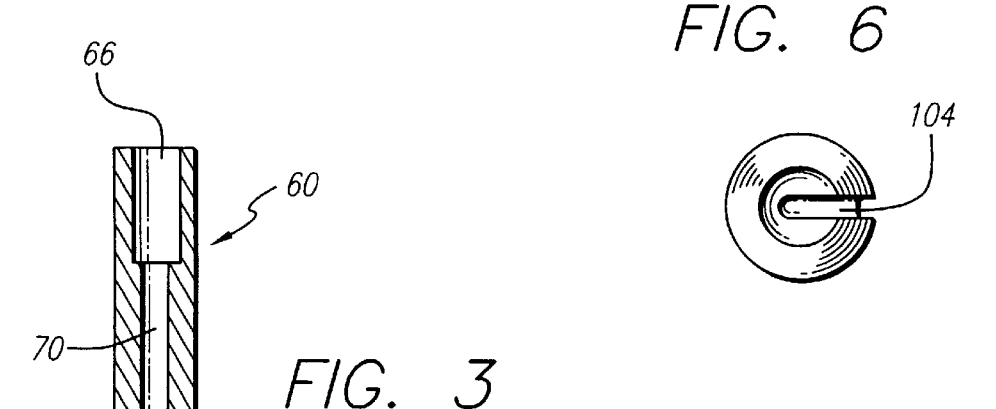
FIG. 3 is a cross sectional view of the spool which is incorporated within the sleeve as shown in FIG. 2.

In FIG. 3, there is shown in cross-section a spool 60 which is reciprocally mounted within the bore 44 defined by the sleeve 40. The spool 60 includes a longitudinal bore 62 and transverse openings 64. The bore 62 provides a continuation of the flow path as does the transverse openings 64. The openings 64 mate with the openings 48 provided in the sleeve 40 to provide the flow of fluid through the flow path 19, 22, 23, 24 as above described. Upon energization of the damper valve the spool 60 moves upwardly to meter such fluid flow and in an on-off valve construction to block such flow. The upper end of the spool 60 also defines a bore 66 within which a spring 68 is mounted. An additional bore 70 is provided interconnecting the bores 62 and 66 to provide pressure balance of the spool 60.

Figure 4:
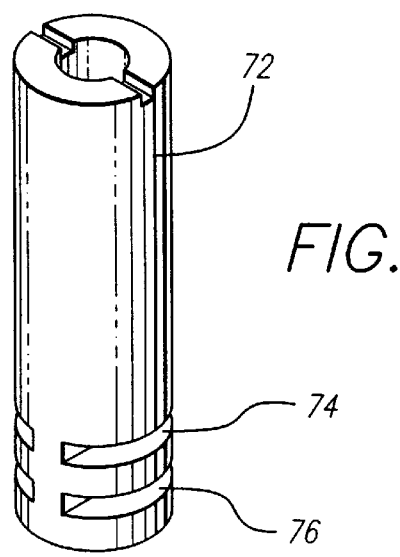
FIG. 4 is a perspective view of an alternative embodiment of a spool.

In some instances, it is desired to have a greater flow path area through the transverse openings provided in the spool. Under these circumstances it has been determined that a spool as shown in FIG. 4 may be provided. As is illustrated in FIG. 4, the body 72 of the spool has two slots 74 and 76 formed therein to provide larger area metering slots for the flow of fluid. Thus, depending upon the application involved, the spool as shown in FIG. 3 or the one shown in FIG. 4 may be utilized without departing from the spirit of the present invention.

Figure 8:
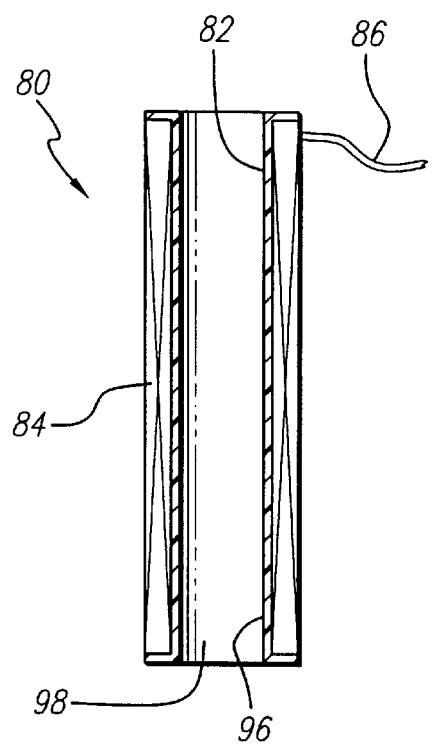
FIG. 8 is a cross-sectional view of an electromagnetic coil mounted upon a bobbin for use in the valve of the present invention.

By referring now to FIG. 8, there is shown a means 80 for generating an electromagnetic field to regulate the flow of fluid through the flow path 19, 22, 23 and 24. As is shown in FIG. 8, the means to generate the electromagnetic field includes a bobbin 82 constructed of insulative material upon which there is wound a coil 84. An electrical lead 86 is connected to the coil 84. The lead 86 as shown more particularly in FIG. 1 is connected to a spring connector 88 to which the lead 32 is connected to provide electrical signals to the coil 84 to energize it and provide an electromagnetic field to control the positioning of the spool 60 as above described. This provides the positive connection to the coil 84. The negative connection to the coil is provided by its contact with the metal portions of the valve or piston rod as may be desired.

Figure 6:
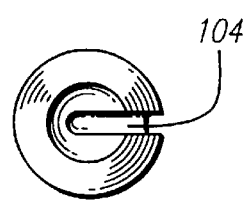
FIG. 6 is a top plan view of the center pole piece of FIG. 5.
Figure 5:
FIG. 5 is a cross-sectional view of a center pole piece utilized in the valve of the present invention.

As shown in FIG. 5, a center pole piece 90 is utilized to enhance the magnetic field generated by the application of an electrical signal to the coil 84. The center pole piece 90 is therefore formed of an appropriate magnetic material having the desired permeability for the application of concern. As is shown, the body 92 of the pole piece has a reduced diameter 94 which is substantially the equivalent of the internal diameter 96 of the bobbin as shown in FIG. 8. The reduced diameter portion 94 of the pole piece 90 is inserted into the opening 98 of the bobbin until it comes into contact with the upper end of the spacer tube 56. As is shown in FIGS. 5 and 6, the upper portion of the cap 100 of the center pole piece 90 has a depression 102 formed therein within which the spring contact 88 is seated. A wire way such as a groove 104 is provided in the cap 100 to receive the wire 86 so that it may be connected between the coil 84 and the spring contact 88.

Figure 7:
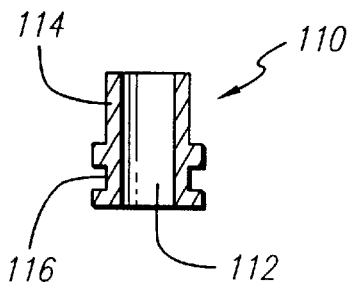
FIG. 7 is a cross-sectional view of a retainer member used in the valve of the present invention.

As is shown in FIG. 7, there is also provided a retainer 110 which defines an opening 112 therein. The opening 112 provides the inlet 22 to the valve 14 flow path 22, 23, 24 as above described. The body 114 of the retainer has a circumferential groove 116 formed therein to receive an o-ring 118. The retainer 110 positions the spool/sleeve assembly within the bore 42 of the piston rod.

To assemble the damper valve constructed in accordance with the present invention, the spool 60 is inserted within the sleeve 40 and the retainer 110 is positioned within the opening 44 of the sleeve 40. The spacer tube 56 is inserted upon the shoulder 54 after which the spring 68 is placed within the bore 66 of the spool. An appropriate shim 118 of non-magnetic material is placed over the top of the spool 60 after which the center pole piece 90 is inserted within the top of the opening 98 of the bobbin 82. The bottom portion of the pole piece will engage the top of the spacer tube 56 thereby providing the desired air gap between the spool 60 which functions as the armature of the valve and the pole piece 90. This assembly is then inserted within the opening 42 defined by the bore in the piston rod 18. The assembly bottoms out against a shoulder 120 formed within the inner portion of the piston rod 18 to limit the upward travel of the damper valve assembly.

Figure 9:
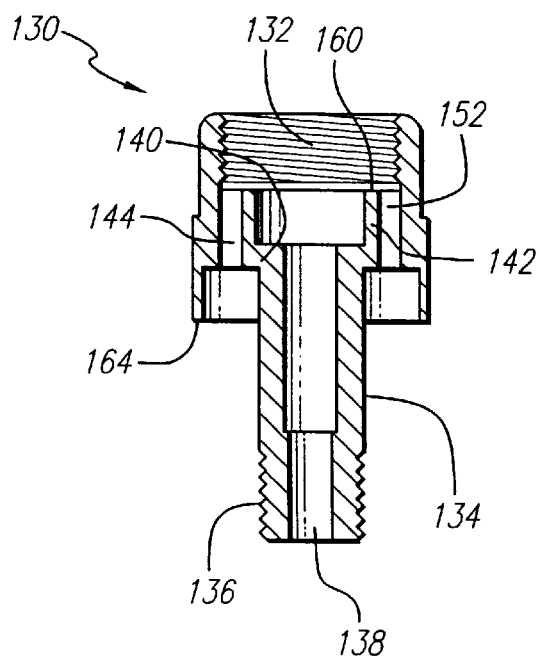
FIG. 9 is a cross-sectional view of an adapter for retaining the valve within the piston rod and providing appropriate flow paths.
Figure 10:
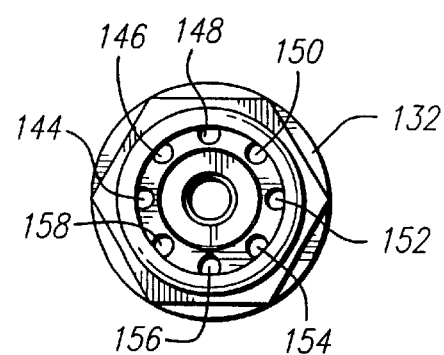
FIG. 10 is a top view of the adapter shown in FIG. 9.

The assembly as described is then retained in position within the bore 42 in the piston rod 18 through the utilization of an adapter 130 as illustrated in FIGS. 9 and 10 which is secured upon the piston rod terminus. As is therein shown, the adapter takes the form generally of a hexagonal nut having appropriate flats as shown at 132 to threadably tighten the adapter 130 upon the lower threaded end of the piston rod 18 by utilization of the interior threads 132 formed therein. The adapter includes a lower extension 134 which also defines exterior threads 136 which are adapted to receive the nut 20 to secure the piston 16 in place as illustrated in FIG. 1. The lower extension defines a longitudinal opening 138 therethrough which interconnects with and provides a portion of the flow path 19, 22, 23, 24 as above described. The adapter 130 includes a body portion 140 which defines a wall 142. A plurality of openings 144 through 158 are provided through the body 140. These openings are separated from the bore 138 by the wall 142 when the adapter 130 is secured by the threads 132 upon the lower threaded end of the piston rod 18. The upper end 160 of the wall 142 engages a washer 162 which preloads the entire assembly against the shoulder 120. The "O" ring 118 is seated against the inner surface of the wall 142 and isolates the inlet and outlet flow through the valve 14.

After the assembly of the damper valve internally within the piston rod 18 as above-described and securing it in place with the adapter 130 the piston 16 is appropriately seated upon the extension 134 with an appropriate spacing between the lower edge 164 of the adapter 130 to provide appropriate flow path for fluid exiting the outlet 24 of the flow path 19, 22, 23, 24 without interference. This entire assembly is then properly loaded within the cylinder 12 for operation as above described.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. An in-piston rod mounted electromagnetically operated damper valve for regulating flow of fluid through a shock absorber to accommodate varying road conditions, said shock absorber including a cylinder and a piston connected to said piston rod and dividing said cylinder into first and second chambers containing fluid, said damper valve comprising:

(a) sleeve means defining a first longitudinal bore therethrough and a transverse opening;

(b) spool means reciprocally mounted within said first longitudinal bore, said sleeve means and said spool means defining a flow path for fluid contained within said shock absorber, said spool means being movable within said first longitudinal bore to regulate flow through said flow path responsive to electromagnetic energization;

(c) means for providing a magnetic field to move said spool means, said means for providing said magnetic field including:
   a coil,
   a pole piece, and
   a portion of said piston rod;

(d) said portion of said piston rod defining a second longitudinal bore therein, said sleeve means, spool means, coil and pole piece being mounted within said second longitudinal bore, said portion of said piston rod comprising a part of a magnetic flux path for providing said magnetic field, and (e) adapter means secured to a terminus of said piston rod for retaining said damper valve within said second longitudinal bore, said adapter means defining a first opening therethrough communicating with said first chamber and forming a portion of said flow path and a second opening therethrough separated from said first opening, communicating with said second chamber and forming a portion of said flow path.

2. An in-piston-rod mounted damper valve as defined in claim 1 wherein said spool means controls communication between said first and second openings in said adapter to regulate fluid flow within said flow path.

3. An in-piston-rod mounted damper valve as defined in claim 1 wherein said second opening includes a plurality of openings disposed around said first opening and said adapter further includes a continuous wall separating said first opening from said plurality of openings.

4. A shock absorber including a damper valve for use on an automotive vehicle comprising:

a cylinder;

a piston reciprocally disposed within said cylinder and dividing said cylinder into first and second chambers containing fluid;

a piston rod secured to said piston, said piston rod defining a bore extending from one end thereof;

a damper valve mounted within said bore defining a fluid flow path between said first and second chambers, said damper valve including a sleeve, a spool reciprocally mounted within said sleeve for regulating fluid flow through said valve, and electromagnetic means for generating a magnetic field to move said spool;

an adapter secured to said one end of said piston rod for retaining said damper valve within said bore, and said adapter defining a first opening therethrough communicating with said first chamber and being a part of said fluid flow path and a second opening therethrough communicating with said second chamber and being a part of said flow path.

* * * * *